United States Patent
Smith et al.

(10) Patent No.: US 7,203,281 B2
(45) Date of Patent: Apr. 10, 2007

(54) ENCAPSULATED STATOR ASSEMBLY FOR AN X-RAY TUBE

(75) Inventors: David Craig Smith, Herriman, UT (US); Mike Vanvoorhis, South Jordan, UT (US); Christopher Artig, Summit Park, UT (US); David Pistorius, West Jordan, UT (US)

(73) Assignee: Varian Medical Systems, Inc., Palo Alto, CA (US)

( * ) Notice: Subject to any disclaimer, the term of this patent is extended or adjusted under 35 U.S.C. 154(b) by 220 days.

(21) Appl. No.: 10/798,637

(22) Filed: Mar. 11, 2004

(65) Prior Publication Data

US 2005/0201520 A1    Sep. 15, 2005

(51) Int. Cl.
*H01J 35/10* (2006.01)
*H01J 35/26* (2006.01)
*H05G 1/04* (2006.01)

(52) U.S. Cl. ...................................... 378/131; 378/201
(58) Field of Classification Search ................ 378/131, 378/201; 29/596; 310/43, 16–20, 51
See application file for complete search history.

(56) References Cited

U.S. PATENT DOCUMENTS

| | | | | |
|---|---|---|---|---|
| 2,939,015 A | * | 5/1960 | Friedrich | 378/202 |
| 3,075,250 A | | 1/1963 | Strohm et al. | |
| 3,821,846 A | * | 7/1974 | Pleiss et al. | 29/596 |
| 4,635,283 A | * | 1/1987 | Starek et al. | 378/132 |
| 4,811,375 A | * | 3/1989 | Klostermann | 378/131 |
| 5,079,466 A | * | 1/1992 | Jones | 310/91 |
| 5,159,618 A | * | 10/1992 | Blake | 378/139 |
| 5,265,147 A | * | 11/1993 | Kim et al. | 378/131 |
| 5,982,131 A | * | 11/1999 | Aino | 318/646 |
| 6,487,273 B1 | * | 11/2002 | Takenaka et al. | 378/142 |

FOREIGN PATENT DOCUMENTS

| | | | |
|---|---|---|---|
| GB | 2293695 | * | 4/1996 |
| JP | 358051754 | * | 3/1983 |
| JP | 407264810 | * | 10/1995 |

OTHER PUBLICATIONS

Dow Corning Product Information: "Information about *Dow Corning®* brand Thermally Conductive Adhesives," Dow Corning Corporation, Midland, Michigan, 2000.

* cited by examiner

*Primary Examiner*—Edward J. Glick
*Assistant Examiner*—Krystyna Suchecki
(74) *Attorney, Agent, or Firm*—Workman Nydegger (57) ABSTRACT

An encapsulated stator assembly for use in stator-driven devices is disclosed. The encapsulated stator assembly includes a stator and a covering portion that envelops the stator. The purpose of the covering portion is multi-fold: first, the covering portion serves as a means for mounting and securing the stator, such as within the outer housing of an x-ray tube. Second, the covering portion is thermally conductive to enable heat produced by the stator during operation to be dissipated to the outer housing of the x-ray tube thereof. Additionally, the covering portion can include an x-ray absorbent material to reduce x-ray emission from the x-ray tube. Though x-ray tubes represent one advantageous application, the encapsulated stator assembly of the present invention can be used in a variety of motor and stator-driven devices. The encapsulated stator assembly is especially well suited for use in dirty or dusty environments.

24 Claims, 10 Drawing Sheets

ENCAPSULATED STATOR ASSEMBLY FOR AN X-RAY TUBE

BACKGROUND OF THE INVENTION

1. The Field of the Invention

The present invention generally relates to stator-driven devices, such as x-ray tubes. In particular, the present invention relates to an improved stator assembly that simplifies installation, reduces related vibration, and provides enhanced stator heat dissipation.

2. The Related Technology

X-ray generating devices are extremely valuable tools that are used in a wide variety of applications, both industrial and medical. For example, such equipment is commonly employed in areas such as medical diagnostic examination and therapeutic radiology, semiconductor manufacture and fabrication, and materials analysis.

In a typical x-ray device, x-rays are produced when electrons are emitted, accelerated, and then impinged upon a material of a particular composition. This process typically takes place within an evacuated enclosure portion of an x-ray tube. Disposed within the evacuated enclosure is a cathode including an electron source, and an anode oriented to receive electrons emitted by the cathode. The anode can be stationary within the tube, or can be in the form of a rotating disk that is mounted to a rotor shaft and bearing assembly. The evacuated enclosure is typically contained within an outer housing. Depending on the type of x-ray tube involved, the outer housing can be air-cooled or can contain a fluid, such as dielectric oil, to cool the x-ray tube.

In operation, an electric current is supplied to the electron source of the cathode, which causes a cloud of electrons to be emitted via a process known as thermionic emission. A high voltage potential is placed between the cathode and anode to cause the cloud of electrons to form a stream and accelerate toward a focal spot disposed on a target surface of the anode. Upon striking the target surface, some of the kinetic energy of the electrons is released in the form of electromagnetic radiation of very high frequency, i.e., x-rays. The specific frequency of the x-rays produced depends in large part on the type of material used to form the anode target surface. Target surface materials with high atomic numbers ("Z numbers") are typically employed. The target surface of the anode is oriented so that at least some of the x-rays are emitted through x-ray transmissive windows defined in the evacuated enclosure and the outer housing. The emitted x-ray beam can then be used for a variety of purposes, including materials analysis and medical evaluation/treatment.

Generally, only a small portion of the energy carried by the electrons striking the target surface of the anode is converted to x-rays. The majority of the energy is instead released as heat. To help dissipate this heat, many x-ray tubes employ rotary anodes, as already mentioned. Rotary anodes include a target surface on a circular face that is directly opposed to the electron source. An annular focal track comprising high-Z materials is formed on the target surface. During operation, the anode is spun at high speeds, thereby causing successive portions of the focal track to continuously rotate in and out of the focal spot of the electron beam emitted by the electron source. The heating caused by the impinging electrons is thus spread out over a relatively large area of the target surface and the underlying anode.

To enable its rotation during tube operation, the rotary anode is rotatably attached to a rotor assembly that is secured within the evacuated enclosure. The rotor assembly typically includes a rotor shaft that supports the anode, a bearing assembly, and a rotor disposed circumferentially about the bearing assembly. Correspondingly, a stator is circumferentially disposed about the rotor. During tube operation, the stator imparts a rotational force to the rotor of the rotor assembly, which in turn causes the anode to spin, as described above.

Various challenges exist with respect to the use of the stators in electrical devices, such as the x-ray tube described above. One challenge involves the manner in which the stator is mounted within the x-ray tube. Typically, a stator is affixed within the outer housing of the x-ray tube using mechanical fasteners, such as screws and brackets. While this method of attachment enables stator operation, it nevertheless suffers from various drawbacks. First, mechanical fastening of the stator to the outer housing creates a structure that is susceptible to mechanical vibration. Such vibration can be detrimental to the x-ray tube and its components. Additionally, vibration within the stator can cause acoustic resonance in the stator windings that results in undesired noise during tube operation. This noise can increase discomfort and stress for a patient, for example, when the x-ray tube is used in a medical imaging device.

Another problem that arises in connection with fastener-secured stators relates to the buildup of excessive heat. The process of anode rotation causes the stator to produce a substantial quantity of heat during tube operation. It is necessary for this heat to be continually removed in order to ensure adequate stator operation. This heat is typically removed from the stator using one of several means, depending upon the tube design. For instance, air-cooled tubes use air convection to remove excess heat from the stator. In oil-filled tubes, by contrast, a cooling fluid is circulated within the outer housing to remove heat from the stator. These attempted solutions alone, however, do little to alleviate the vibrational and acoustic challenges discussed above.

In an attempt to overcome some of the problems outlined above, some x-ray tubes employ a potting material that is packed around the stator after it has been positioned and secured within the outer housing of the x-ray tube by mechanical fasteners. Not only does packing potting about the stator require a significant expenditure of time during tube manufacture, but it also represents a time-consuming task should the replacement or repair of the stator ever become necessary. Additionally, the use of packed potting presents a potential contamination source for the cooling fluid in oil-filled tubes, which can result in both diminished effectiveness of the fluid and reduced operational lifetime of the x-ray tube.

Further, x-ray tubes having stators with packed potting also suffer from a reduced ability to remove heat from the stator given the low contact pressure existing between the potting material about the stator and the inner surface of the outer housing to which heat can be conducted from the stator.

In light of the above, a need exists for a stator-driven device, such as an x-ray tube, that overcomes the above stator-related challenges. In particular, there is a need for an x-ray tube featuring a stator assembly that is securely positioned within the x-ray tube such that acoustic noise and vibrational affects are substantially reduced or eliminated. Further, any such solution should be designed to effectively dissipate heat from the stator during tube operation. Additionally, any solution should feature a simple design to facilitate ease of assembly and stator change-out within the tube.

SUMMARY OF EXEMPLARY EMBODIMENTS OF THE INVENTION

The present invention has been developed in response to the above and other needs in the art. Briefly summarized, embodiments of the present invention are directed to a pre-formed, encapsulated stator assembly for use in stator-driven devices, such as x-ray tubes and the like. The encapsulated stator assembly includes various features that enhance the operation of not only the stator itself, but the entire x-ray device as well.

In one embodiment, the encapsulated stator assembly includes a stator having a core and a plurality of windings wrapped about the core. The stator is enveloped by a covering portion such that the stator is substantially enclosed, or encapsulated, by the covering portion. The encapsulation of the stator is performed before its placement within the device, such as in the case where the stator is positioned within the outer housing of an x-ray tube, and further, minimizes potential areas of mechanical failure within the tube.

Enclosure of the stator within the encapsulating covering portion provides several benefits. First, in one embodiment the material of which the covering portion is composed is a resilient material and forms an outer surface of the encapsulated stator assembly when manufactured as described herein. This outer surface can be configured to compressively engage the inner surface of the x-ray tube outer housing in an interference fit, thereby securing the encapsulated stator assembly, and thus the stator, in a predetermined and desired position within the x-ray tube. Placement of the stator in this manner obviates the need for fastening the stator to the outer housing using mechanical fasteners, such as screws, brackets, etc. This, in turn reduces undesired vibrations in the x-ray tube during operation, and further, minimizes potential areas of mechanical failure within the tube.

Second, x-ray tube noise is also reduced due to the acoustic dampening nature of the encapsulating stator assembly. Such noise is typically produced by the stator windings, which resonate during tube operation. In the present stator assembly, by contrast, the windings are enveloped by the encapsulating material, thereby fixing them in place and preventing their resonance, which in turn reduces tube noise.

Third, the encapsulated stator assembly provides an improved thermal path by which heat produced by the stator during tube operation can be effectively and continuously removed. In one embodiment, the covering portion is thermally conductive and is able to absorb heat produced by the stator as it induces rotation of the rotor assembly and rotary anode. The heat absorbed by the covering portion is conducted to the outer surface of the encapsulated stator assembly, where it is readily transferred to the outer housing and dissipated to the environment.

Fourth, the stator in the present encapsulated stator assembly is protected as a result of being enveloped by the encapsulating material. This prevents, among other things, unintended contact between stator windings, which can otherwise result in short circuiting and damage to the stator. This feature also prevents the intrusion of dirt, grime, and other contaminants into the stator, which can otherwise shorten its operational life. Thus, the present invention advantageously facilitates the use of stators in dirty and dusty environments without the risk of damage due to contamination.

In addition to the above benefits, other embodiments of the present invention provide additional features. In one embodiment, for instance, an x-ray shielding material can be added to the encapsulated stator assembly to provide supplemental x-ray shielding for the x-ray tube. In another embodiment, the encapsulated stator assembly is positioned and secured within the tube via a plurality of O-rings that are positioned about the outer diameter of the stator assembly. The O-rings enable a secure fit to occur between the encapsulated stator assembly and the outer housing of the tube when a compressive fit between the stator assembly and the outer housing is not desired or possible. This configuration can be used in designs where heat removal from the stator is not critical.

In yet another embodiment, the encapsulated stator assembly can be configured to attach directly to the x-ray tube, thereby obviating the need for a mounting interface with the outer housing. In some cases, this may enable the outer housing to be completely eliminated from the x-ray tube design.

One embodiment of the present invention therefore discloses an encapsulated stator assembly for use in a stator-driven device, comprising a stator having a core and a plurality of windings, and a covering portion that forms at least a partial covering over the stator, the covering portion including an outer surface that compressively engages with a portion of the stator-driven device to secure the stator in the stator-driven device.

These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof that are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF EXEMPLARY EMBODIMENTS

Reference will now be made to figures wherein like structures will be provided with like reference designations. It is understood that the drawings are diagrammatic and schematic representations of presently preferred embodiments, and are not limiting of the present invention nor are they necessarily drawn to scale.

FIGS. 1–8 depict various features of example embodiments of the present invention, which is generally directed to an encapsulated stator assembly for use in stator-driven devices. An x-ray tube is one example of a stator-driven device that can include an encapsulated stator assembly of the type shown, though it is appreciated that other motor and stator-driven devices can benefit from the present invention as well. Thus, while the description to follow focuses on use of the present encapsulated stator assembly in connection with an x-ray tube, this is not meant to be limiting of the present invention in any way.

Figure 1:
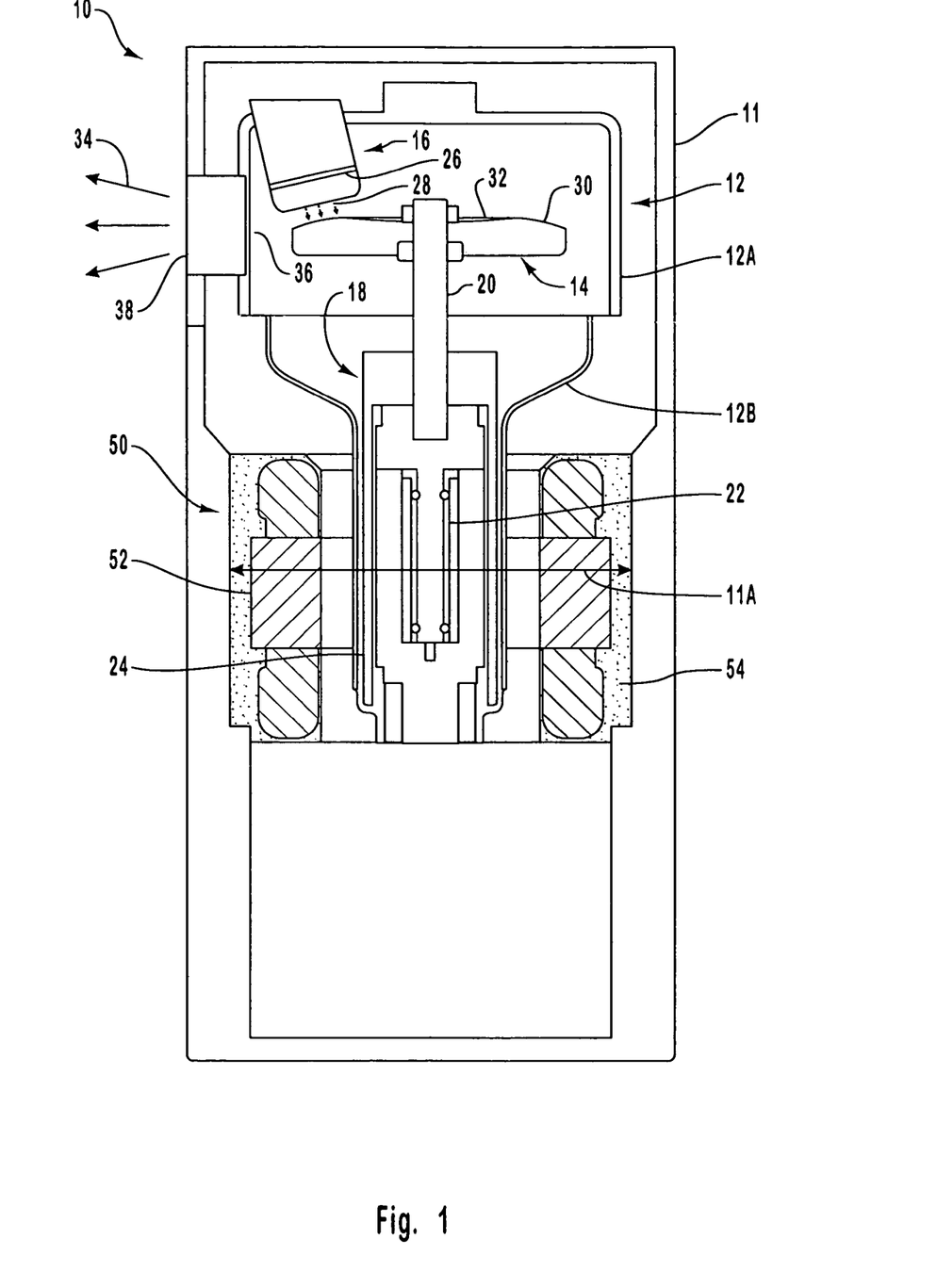
FIG. 1 is a cross sectional view of an x-ray device tube including an encapsulated stator assembly according to one embodiment of the present invention.

Reference is first made to FIG. 1, which illustrates a simplified structure of a rotating anode-type x-ray tube, designated generally at 10. The x-ray tube 10 depicted here preferably comprises part of an x-ray generating device (not shown) for use in producing and emitting x-rays, as described above. The x-ray tube 10 can be air-cooled, as shown here, or can be of the type that is liquid cooled, such as a dielectric coolant oil.

The x-ray tube 10 includes an outer housing 11, within which is disposed an evacuated enclosure 12. The evacuated enclosure 12 in this particular example is created by hermetically joining a first segment 12A with a second segment 12B. The first segment 12A generally contains a rotary anode 14, while the second segment 12B contains a cathode 16. The anode 14 is spaced apart from and oppositely disposed to the cathode 16, and is composed of an appropriate material, such as a thermally conductive material like tungsten or a molybdenum alloy.

The anode 14 is rotatably supported within the evacuated enclosure 12 by a rotor assembly, generally designated at 18. While a rotor assembly can be configured in a variety of ways, in the illustrated example, assembly 18 includes a rotor shaft 20, a bearing assembly 22, and a rotor 24. The rotor shaft 20 attaches to the anode 14 to support it in a predetermined position within the evacuated enclosure 12. The bearing assembly 22 is interposed between the rotor shaft 20 and a stationary portion of the tube 10 to enable relative rotation of the rotor shaft during tube operation. The rotor 24 is circumferentially positioned about the bearing assembly 22 so as to form an inductive motor and be rotationally driven by a stator (described below), which in turn causes rotation of the rotor shaft 20 and anode 14 during tube operation.

The cathode 16 includes a filament 26 that is connected to an appropriate power source. The rotary anode 14 and cathode 16 are also connected within an electrical circuit that allows for the application of a suitable voltage potential between the anode and the cathode. An electrical current passed through the filament 26 causes a stream of electrons, designated at 28, to be emitted from the cathode 16 by thermionic emission. The high voltage differential between the rotary anode 14 and the cathode 16 then causes electrons 28 to accelerate from the cathode filament 26 toward a focal track 30 that is positioned on a target surface 32 of rotary anode 14. The focal track 30 is typically composed of tungsten or a similar material having a high atomic ("high Z") number. As the electrons 28 accelerate, they gain a substantial amount of kinetic energy. Upon striking the a portion of the focal track 30, some of the electrons 28 convert their kinetic energy and either emit or cause to be emitted electromagnetic waves of very high frequency, i.e., x-rays. A portion of the resulting x-rays, designated at 34, emanates from the anode target surface 32 and is then collimated through windows 36 and 38 defined in the evacuated enclosure 12 and outer housing 11, respectively, for penetration into an object, such as an area of a patient's body. As is well known, the x-rays that pass through the object can be detected and analyzed so as to be used in any one of a number of applications, such as x-ray medical diagnostic examination or materials analysis procedures.

During operation of the x-ray tube 10 described above, the rotary anode 14 is continuously rotated by the rotor assembly 18, which in turn is rotated by a stator. In accordance with embodiments of the present invention, an encapsulated stator assembly, generally designated at 50, is used to induce rotation of the rotor assembly 18 of the x-ray tube 10. As will be described herein, the encapsulated stator assembly 50 improves the operation of the x-ray tube 10 and, in various respects, simplifies its testing and assembly.

Figure 2:
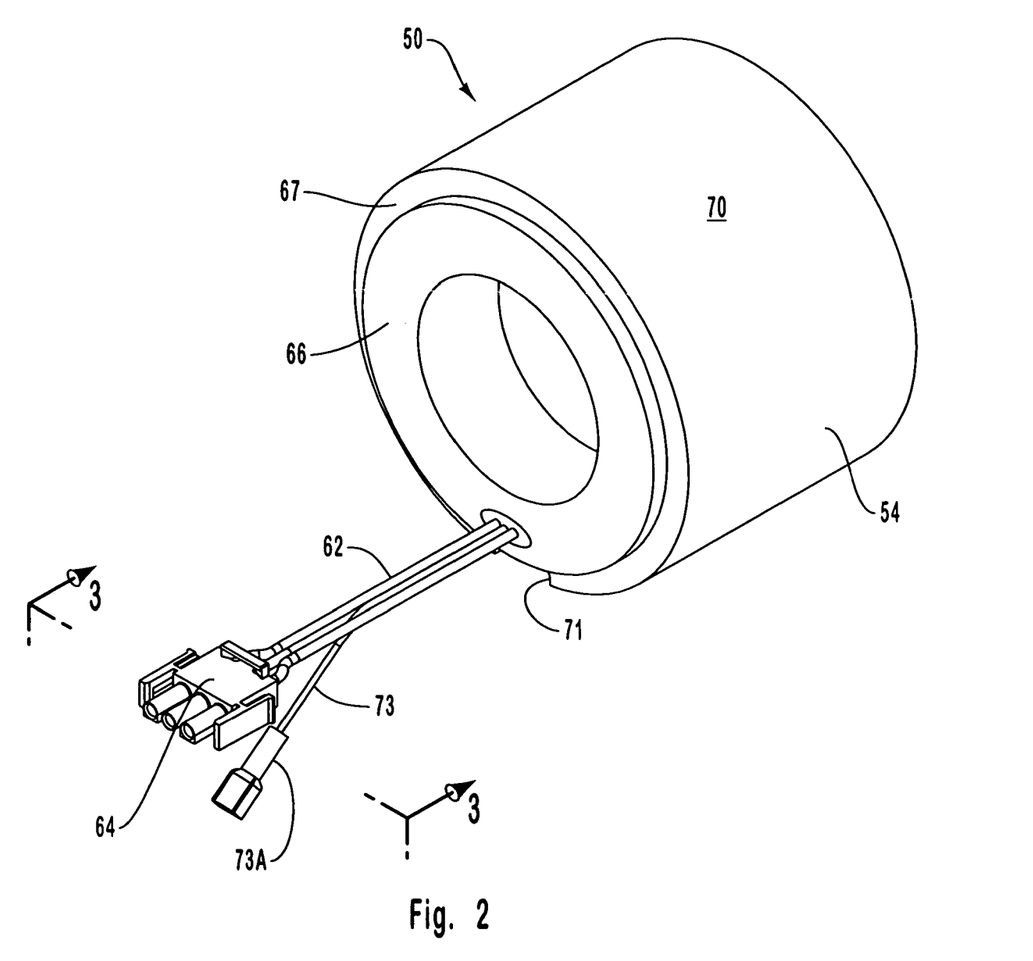
FIG. 2 is a perspective view of the encapsulated stator assembly of FIG. 1.
Figure 3:
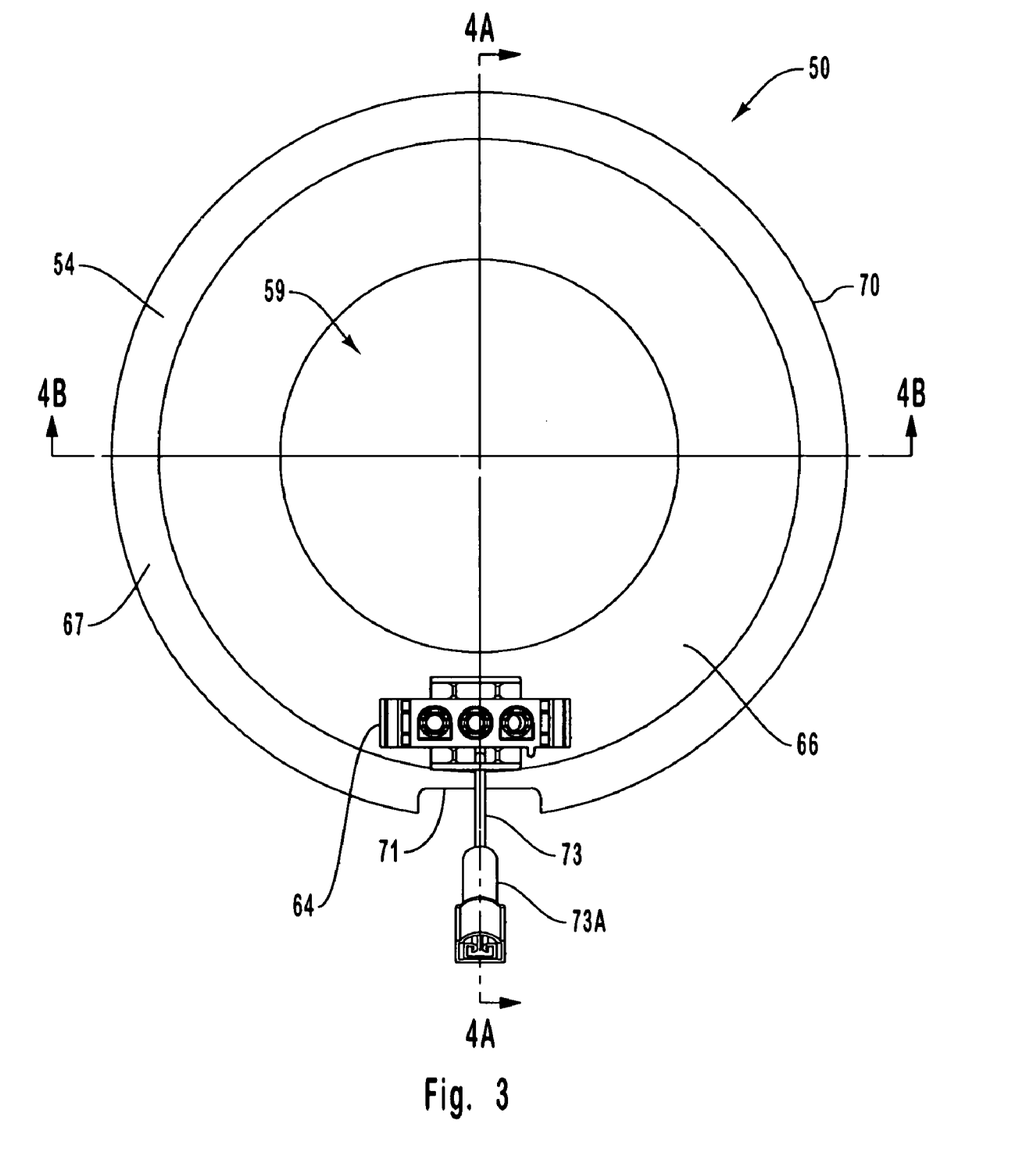
FIG. 3 is an end view of the encapsulated stator assembly taken along the line 3—3 of FIG. 2.
Figure 4A:
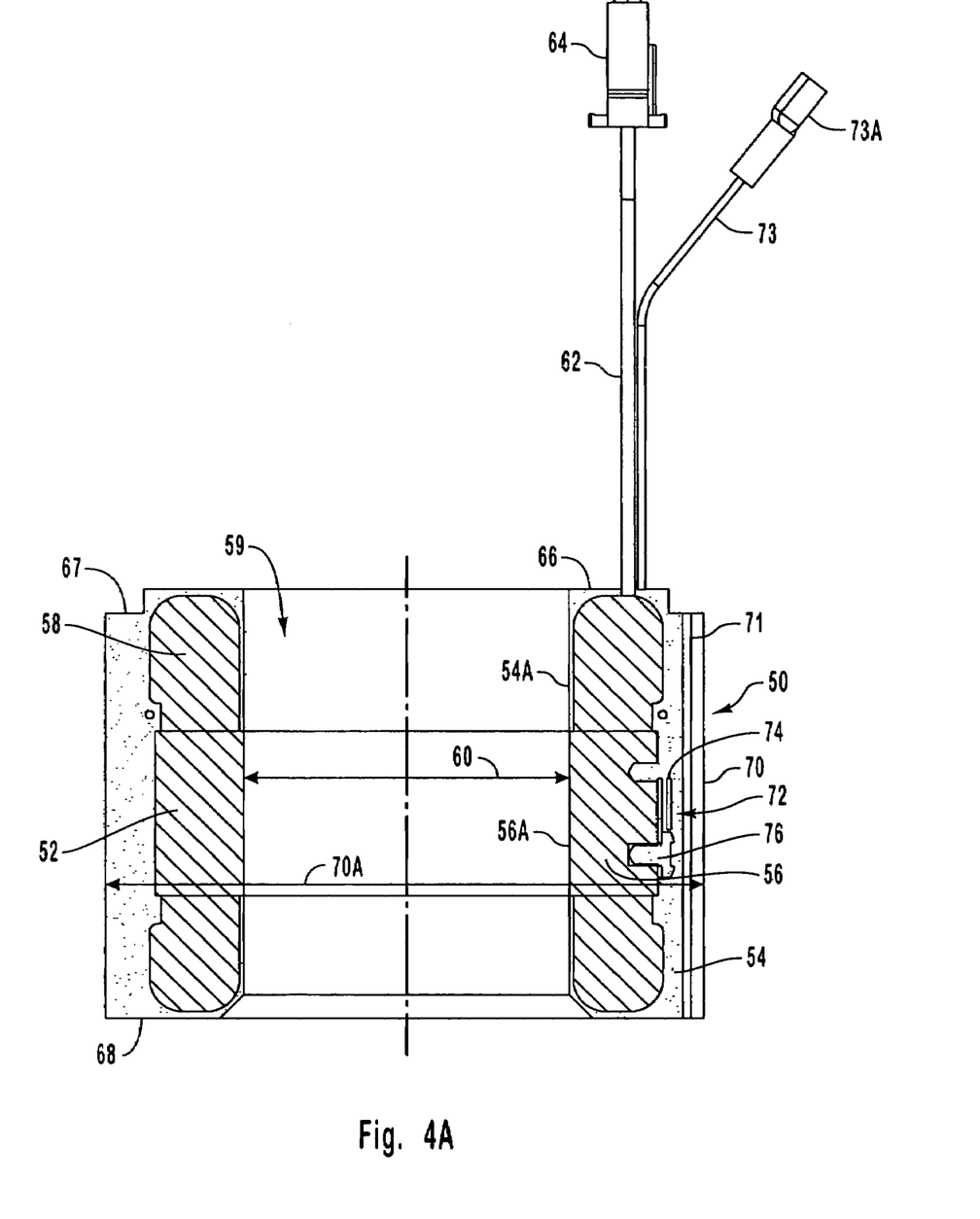
FIG. 4A is a cross-sectional view of the encapsulated stator assembly taken along the line 4A—4A of FIG. 3.
Figure 4B:
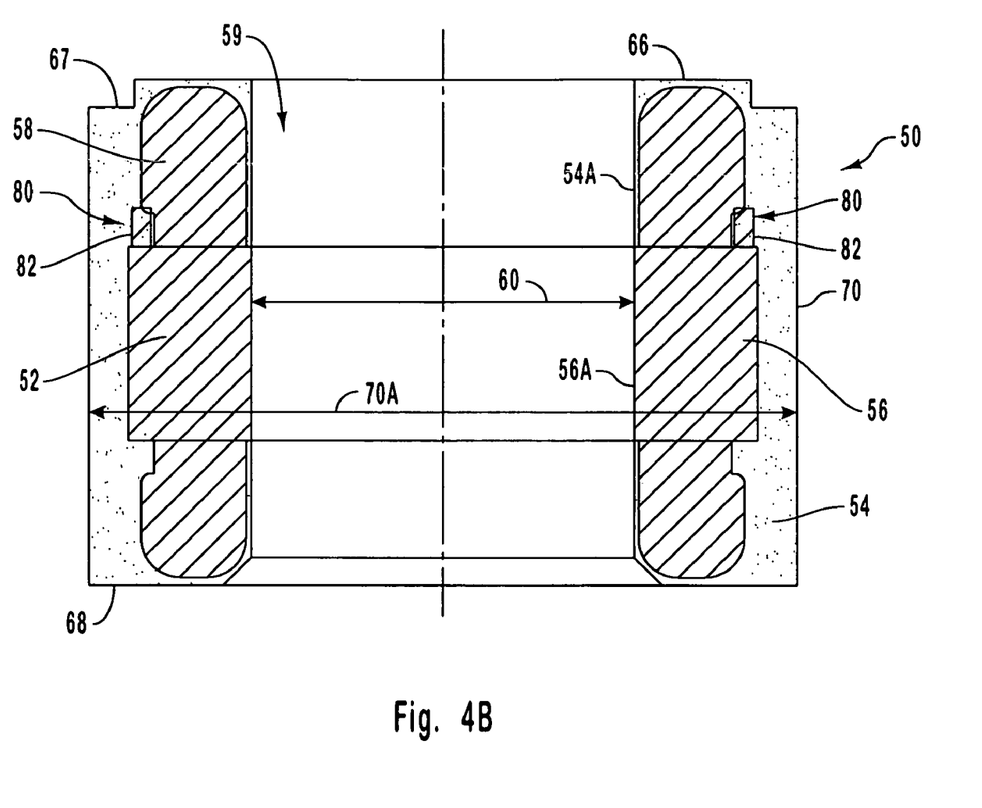
FIG. 4B is a cross-sectional view of the encapsulated stator assembly taken along the line 4B—4B of FIG. 3.

Reference is now made to FIGS. 2, 3, 4A, and 4B, wherein various details of an example implementation of the encapsulated stator assembly ("ESA") 50 are disclosed. In general, the ESA 50 includes a stator 52 and a covering portion 54. The structure of the stator 52 is similar to that of known stators, and it can include one of a variety of specific stator designs known in the art, or even novel stator designs. Specifically, the stator 52 in the example embodiment includes a core 56 and a plurality of windings 58 wrapped about the core. As shown in FIGS. 4A and 4B, an inner cylindrical cavity 59 of the ESA 50 is cooperatively defined by the stator core 56 and the covering portion 54. In other embodiments, the stator windings 58 can also cooperate to define the inner diameter, or the covering portion alone can define the inner diameter. Also, a multi-diameter inner cavity defined by different ESA components is possible. The size of the inner cylindrical cavity 59 is defined by an ESA inner diameter 60, and is sufficiently sized to receive a portion of the first evacuated enclosure segment 12A (see FIG. 1) when the ESA 50 is positioned within an assembled x-ray tube. As shown in FIG. 1, the rotor 24 of the rotor assembly 18 resides in the portion of the first evacuated enclosure segment 12A that is received into the inner cylindrical cavity 59. This arrangement provides the needed proximity between the stator 52 and the rotor 24 to enable rotational forces produced by the stator to be induced in the rotor, which results in corresponding rotation of the rotary anode 14. Other stator designs in addition to that explicitly described here are also possible. Furthermore, the principles applied herein to a stator can be similarly applied to other electromotive devices, such as various motors and the like.

As shown in FIGS. 1–4B, the covering portion 54 of the ESA 50 is formed about the stator 52 as to substantially envelop the stator. In detail, the covering portion 54 encapsulates a significant portion of the stator 52, with the exception of an inner, annular portion 56A of the stator core 56 that partially defines the inner cylindrical cavity 59 of the ESA 50. Thus, the annular portion 56A of the stator core 56 and an annular portion 54A of the covering portion 54 cooperate to define the ESA inner cylindrical cavity 59 of the ESA 50, which is measured by the inner diameter 60, as mentioned above.

Note that the illustrated embodiment shown in FIGS. 1–4B is but one possible configuration for encapsulating the stator 52 with the covering portion 54. Indeed, in accordance with other embodiments, more or less of the stator can be enveloped by the covering portion 54. For example, the covering material can be applied such that the stator is completely covered or encapsulated thereby, as shown by ESA 150 in FIG. 7; thus no portion of the stator would be visible upon inspection. Correspondingly, the covering material can be applied to the stator such that a relatively substantial portion of the stator is left exposed. These and other similar variations of the stator/covering portion configuration are therefore contemplated as part of the present invention.

As shown in FIGS. 2 and 3, the stator (FIGS. 4A and 4B) includes a plurality of wires 62 and one or more electrical connectors 64 for providing an electrical supply to the stator. The wires 62 extend from the stator 52 through the covering portion 54, and thus are not encapsulated by the covering portion. This enables the electrical connectors 64 to interconnect with corresponding receptacles within the x-ray tube 10 when the tube is assembled.

FIGS. 1–4B further illustrate that the covering portion 54 defines various exterior surfaces of the ESA 50. Specifically, a first end 66, a second end 68, and a substantially cylindrical outer surface 70 are defined by the covering portion 54. In the illustrated embodiment, the size of the outer surface 70 of the covering portion 54 is defined by an outer diameter 70A. Note that the above-described inner cylindrical cavity 59 of the ESA 50 extends from the first end 66 to the second end 68 of the covering portion 54, though in other embodiments one or both ends can be closed, if desired. Further, the inner-cylindrical cavity 59 can be shaped other than cylindrically, if needed.

Each of the exterior surfaces of the covering portion 54 can be shaped to fit a particular application. In the present embodiment, for instance, a ridge 67 is defined on the first end 66 of the covering portion to enable positioning of the ESA 50 within the outer housing 11 of the x-ray tube 10. Likewise, a depressive notch 71 is longitudinally defined along a portion of the outer surface 70. These or other features can be added to the covering portion 54 in order to suit a particular application.

More generally, it is appreciated that the overall shape of the ESA can be varied according to a particular application. As such, the outer surface of the ESA can define square, oval, irregular, or other shapes, as may be needed. Likewise, the first end, second end, and inner cylindrical cavity of the ESA can also be differently shaped according to desired design.

As best seen in FIGS. 4A and 4B, various other features are included in the example embodiment of the ESA 50. A grounding assembly 72 is partially shown in FIG. 4A, including a grounding wire 73 and associated connector 73A. The grounding wire 73 extends into the covering portion 54 and has a ring 74 crimped thereto. A screw 76 is also included to secure the ring 74 in position. This structure is used to ensure adequate grounding of the stator 52 during operation, and it is appreciated that the particular construction and design of the grounding assembly can vary according to need or preference.

Similarly, FIG. 4B shows portions of a thermal switch assembly 80, including a thermal switch 82 that is positioned in close proximity to the body of the stator 52. The thermal switch 82 is so positioned to monitor the temperature of the stator 52 and to interrupt its operation, and/or operation of the entire tube 10, in the event that heat buildup in the stator becomes excessive. The thermal switch 82 is secured to the stator 52 by appropriate means, such as a tie wrap (not shown), and can be electrically attached to an appropriate power supply wire using a butt splice (not shown). Other thermal switch arrangements can also be used. In addition, other stator features can be included in the present ESA, as contemplated by those skilled in the art.

In the illustrated embodiments, the covering portion 54 of the ESA 50 is composed of a material that optimizes the operational characteristics of the stator 52. For instance, in the present embodiment shown in FIGS. 1–4B, the covering material is composed of a thermally conductive, dielectric material. Specifically, in one embodiment, the covering material 54 is composed of a silicone adhesive, product number 3-6642, produced by DOW CORNING®. The silicone adhesive 3-6642 is a two-part product that is mixed in the proper proportions prior to use. Details regarding the use of silicone adhesive 3-6642 in producing the ESA 50 are given further below. In addition, other materials can also be acceptably used to form the covering portion 54, such as epoxy/silicone mixtures, for example.

As mentioned in present embodiments the material of which the covering portion 54 is composed, such as the silicone adhesive 3-6642 described above, possesses certain characteristics that optimize operation and placement of the stator 52 within the x-ray tube 10. First, the covering material 54 serves to secure the stator 52 within the outer housing 11 of the x-ray tube 10, as seen in FIG. 1. Specifically, the outer surface 70 of the covering portion 54 is shaped and sized as to cooperatively fit within the outer housing 11 of the x-ray tube. Further, the fit that is established between the ESA 50 and the outer housing 11 is a compression fit that retains the ESA 50 in a specified position within the outer housing after placement thereof is complete.

Figure 6A:
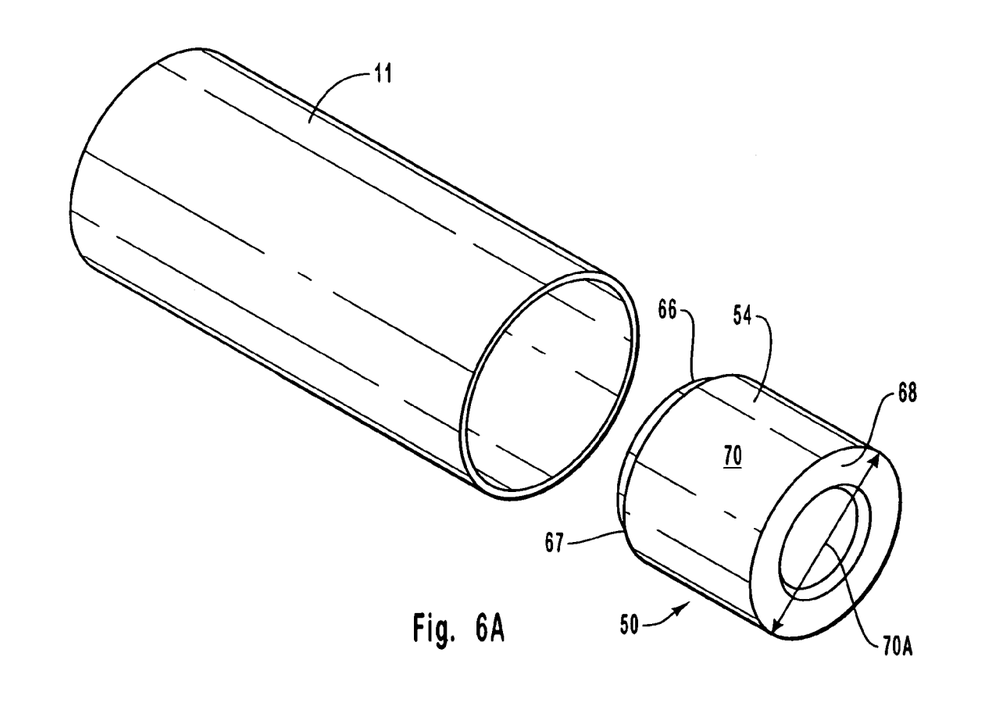
FIG. 6A is a perspective view showing one step in the assembly of an x-ray tube housing having an encapsulated stator assembly.
Figure 6B:
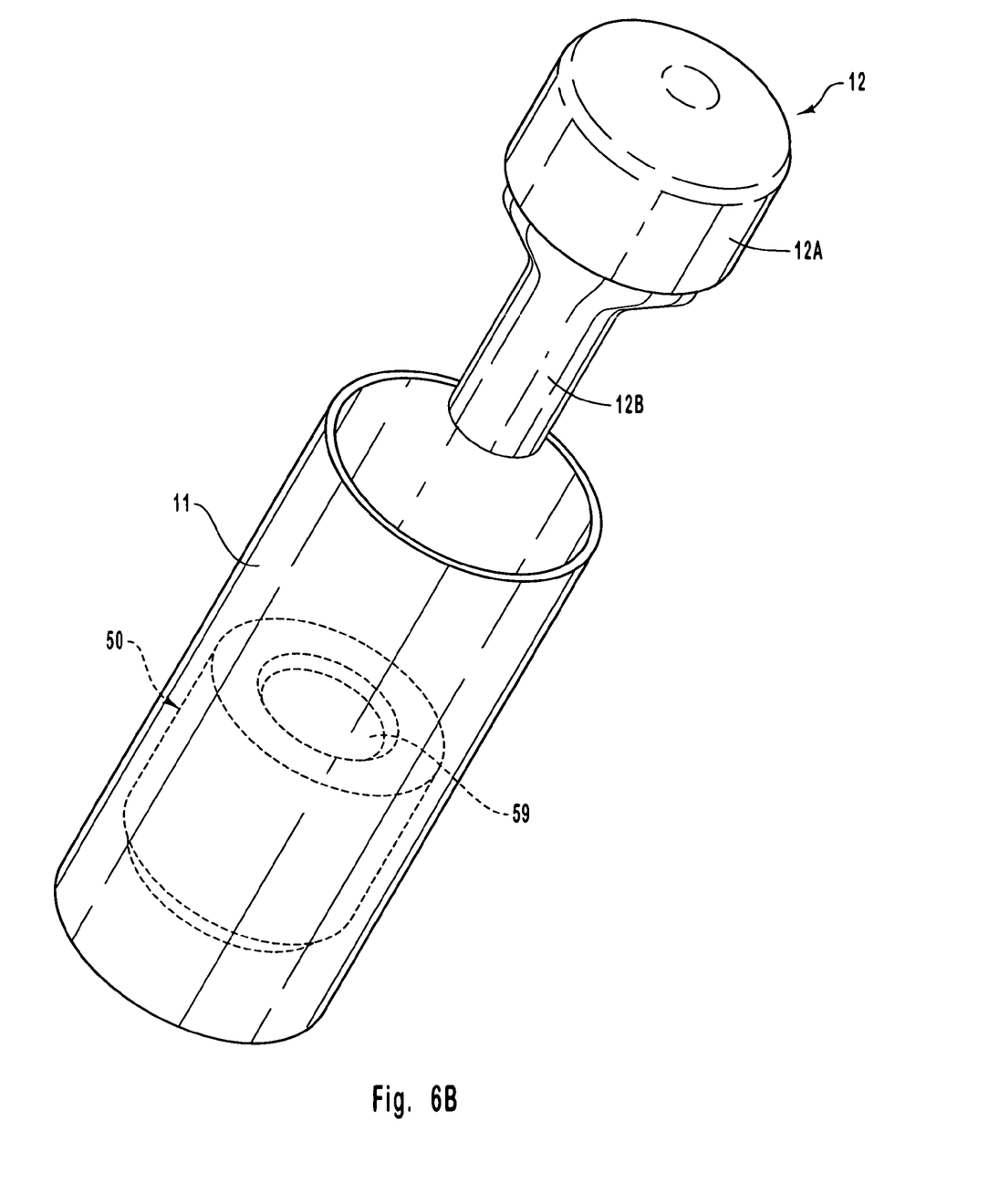
FIG. 6B is a perspective view showing another step in the assembly of an x-ray tube housing having an encapsulated stator assembly.
Figure 6C:
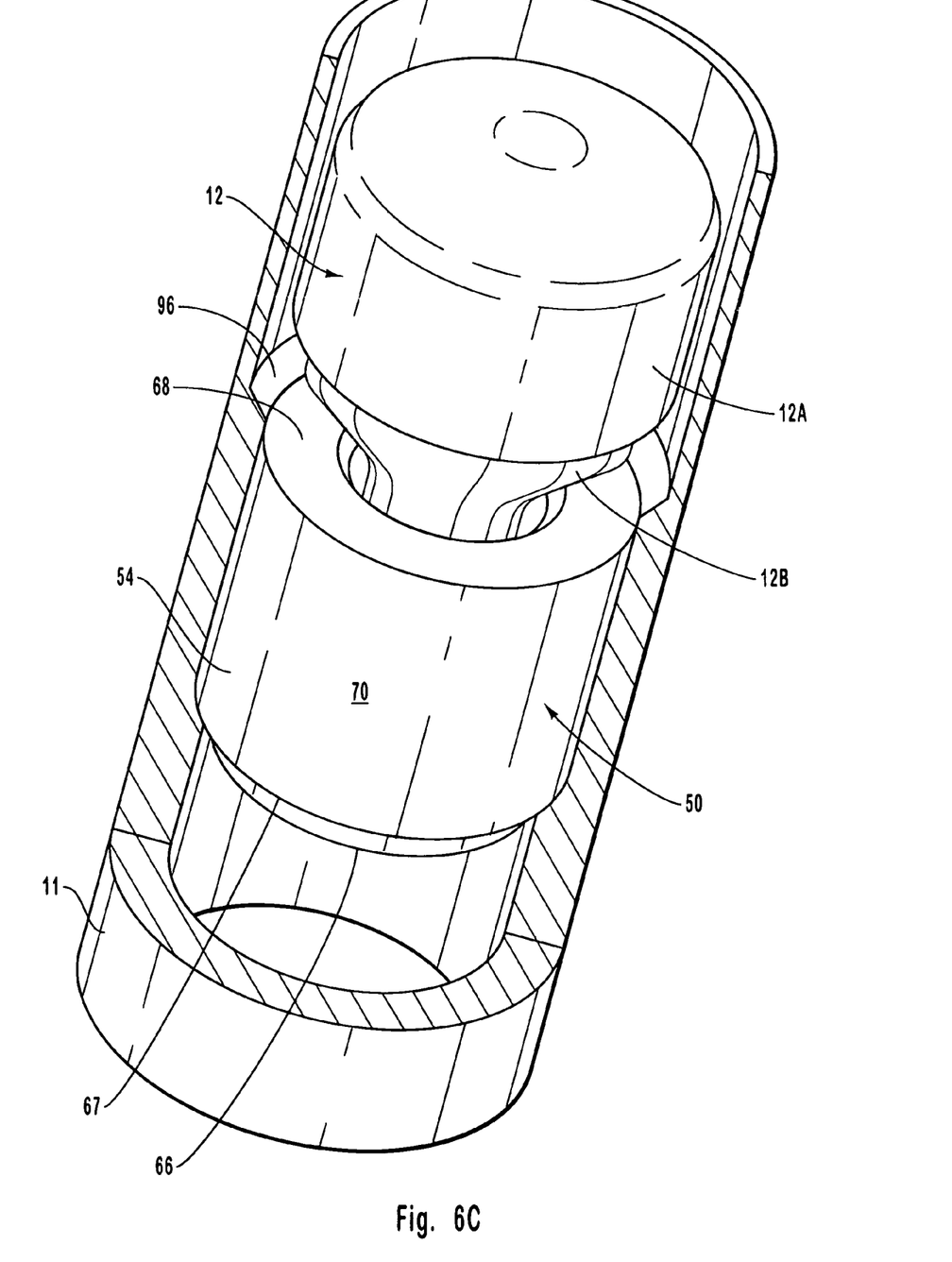
FIG. 6C is a simplified perspective/break away view of an assembled x-ray tube including an encapsulated stator assembly installed in an x-ray tube housing.

As will be seen in connection with FIGS. 6A–6C, to facilitate the above compression fit that secures the ESA 50 within the outer housing 11, the outer surface 70 of the ESA is shaped, in this case cylindrically, to correspond to the shape of the inner surface of the outer housing, which is also cylindrical. Further, the outside diameter 70A of the covering portion outer surface 70 is preferably sized slightly greater than an inside diameter defined by the inner surface of the outer housing 11. Also, the covering portion 54 is preferably composed of a material, such as the silicone adhesive 3-6642 spoken of above, that possesses resilient characteristics. "Resilient," as used herein, is understood to mean, at least, that the material has elastomeric qualities and can be deformed from a pre-existing shape but exerts a force to return to that shape. These aspects of the ESA 50 together enable the covering portion 54 of the ESA to be slightly compressed upon insertion into the outer housing 11 during tube assembly, thereby causing a compressive force to be introduced between the two components as a result of the resilient nature of the covering portion material. This compressive force is sufficient to maintain the ESA 50 in place within the outer housing 11 after positioning thereof is complete. This positioning aspect of the ESA 50 is described in further detail below in connection with FIGS. 6A–6C.

Because of the mechanical contact pressure produced by the covering portion 54 of the ESA 50 against the outer housing 11 of the x-ray tube 10, securing of the stator 52 by other methods, such as mechanical fasteners is unnecessary. This eliminates many of the problems with such fasteners, such as vibrations and associated noise within the x-ray tube 10 during operation. Also, the compressive securing described above makes in-place potting of the stator 52 unnecessary, thereby preventing the problems that accompany in-place potting techniques, such as the difficulty encountered in replacing the stator if change-out is needed.

It should be noted that the above description of securing the ESA within an x-ray tube represents only one exemplary embodiment. Indeed, certain modifications to the present embodiment are also contemplated as part of the present invention. For instance, the covering portion 54 can include materials other than the silicone adhesive 3-6642 that still possess similar or alternative qualities to those described herein. Also, other ways by which the ESA can be secured within the outer housing are also contemplated, as is explicitly described in a succeeding embodiment further below. Moreover, the ESA can be configured to compressively engage outer housings having differing structures, or even structures other than an outer housing as set forth herein. These and other modifications to the illustrated embodiments are therefore contemplated.

A second characteristic of the covering portion 54 of the ESA 50 that optimizes the performance of the stator 52 deals with heat removal from the stator. As is known, the stator 52 produces heat during its operation. This heat should be reliably and continuously removed from the stator 52 in order to ensure its proper operation. In the present embodiment, the covering portion 54 is composed of a thermally conductive material, such as the silicone adhesive 3-6642 described above, that acts as a heat sink for the stator. During operation of the x-ray tube 10, heat emitted from the stator 52 is readily absorbed by the covering portion 54 that envelops the stator. The heat that is absorbed by the covering portion 54 is conducted to the outer surface 70 thereof, where it can then be transferred to the outer housing 11 of the x-ray tube 10 and dissipated to the surrounding environment. In this way, heat can be reliably removed from the stator 52. As already described, the thermal switch assembly 80 can be used to ensure that, in any case, the stator 52 does not overheat. Additionally, the improved heat removal from the stator 52 made possible by the covering portion 54 of the ESA 50 enables the x-ray tube 10 to be operated at a relatively higher temperature than what would be possible without the ESA in place, thereby expanding the utility of the tube.

In one example embodiment, the silicone adhesive 3-6642 includes a two-part mixture. In other embodiments, however, the composition of the silicone adhesive 3-6642 (or other suitable covering) can be modified as desired to optimize its characteristics in terms of thermal conductivity, resilience, or other quality. This can be done, in the case of the silicone adhesive 3-6642 or similar mixture, by altering the relative proportions of the respective constituents that make up the mixture or, in other embodiments, by adding supplemental materials. In one embodiment, for example, boron-nitride can be added to the silicone adhesive 3-6642 mixture to increase the thermal conductivity of the covering portion.

It is further appreciated that, though the covering portion of the ESA described herein is integrally formed, in other embodiments the covering portion can include two or more pieces joined together to form a corresponding part of the ESA.

As seen above, the material from which the covering portion is composed can have various characteristics to optimize stator operation. In one embodiment, it can be a resilient material to facilitate mounting of the stator within a device, such as the outer housing of an x-ray tube, or a portion of another device in which the x-ray tube is disposed. The material should be dielectric and/or thermally stable, and can be thermally conductive in order to assist in heat removal from the stator. In addition, the material from which the covering portion is made can include other properties alternative to or in addition to the above properties, in order to optimize stator operation.

Figure 5A:
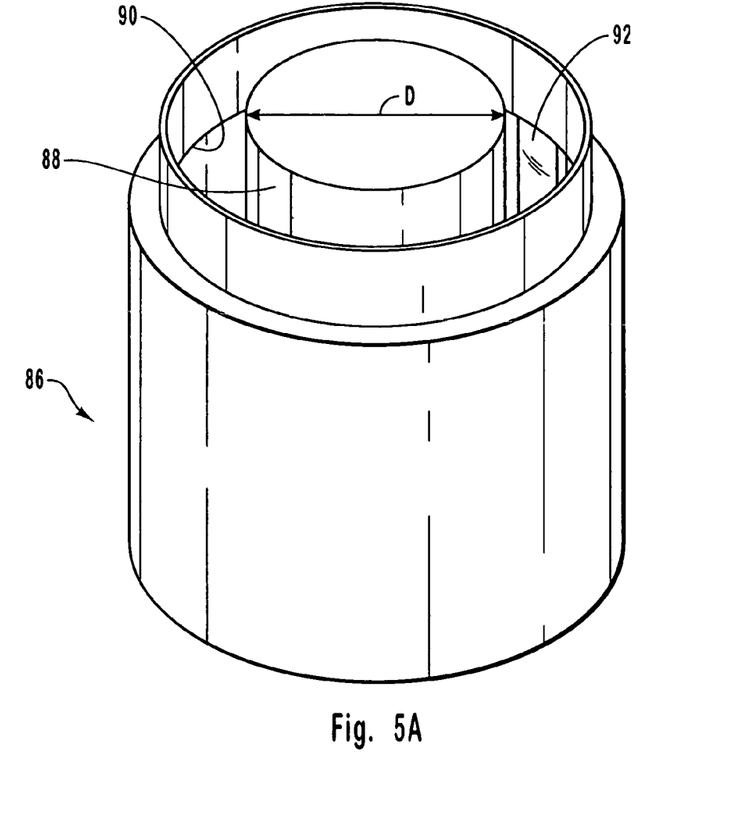
FIG. 5A is a perspective view of a mold that can be employed in manufacturing the encapsulated stator assembly, according to one embodiment.
Figure 5B:
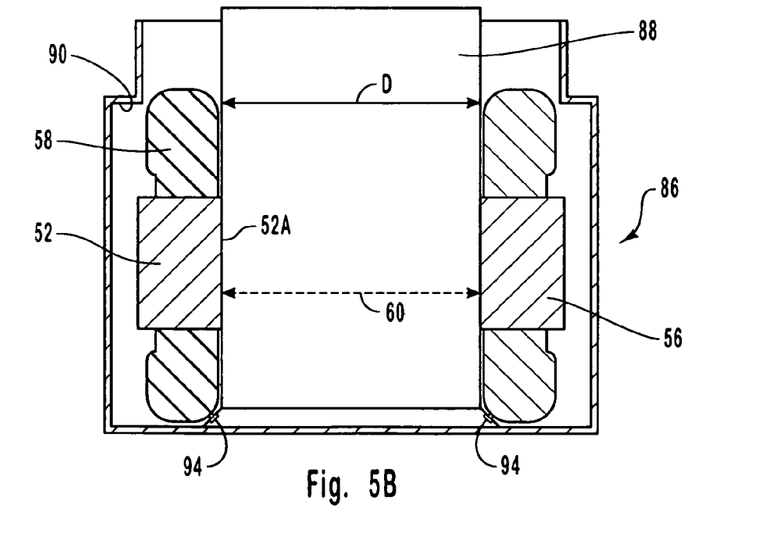
FIG. 5B is a cross-sectional view of the mold of FIG. 5A, showing a stator positioned therein prior to being encapsulated.
Figure 5C:
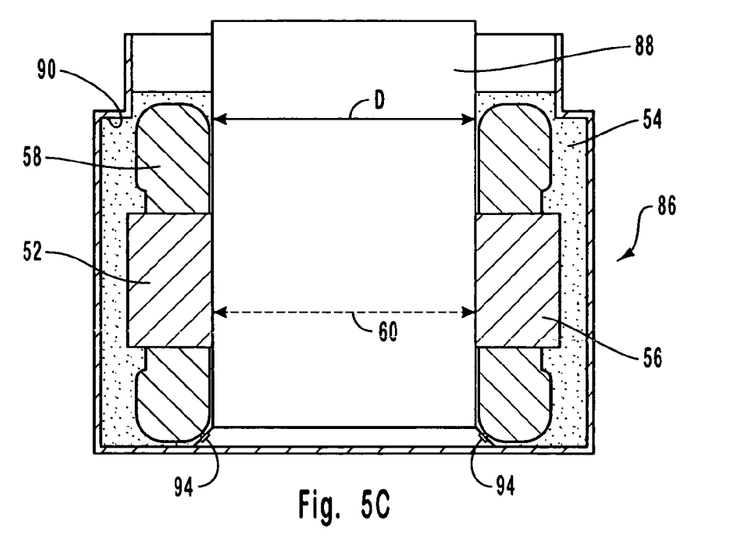
FIG. 5C is a cross-sectional view of the mold of FIG. 5B, showing the encapsulating material inserted within the mold.

Reference is now made to FIGS. 5A–5C in describing various steps in the manufacture of the ESA 50 for use within an x-ray tube, such as the tube 10 shown in FIG. 1. The ESA 50 is formed in one embodiment using molding techniques. Though one particular technique is shown, other molding techniques can be applied to produce the ESA. In addition, other formation techniques, such as machining, milling, casting, etc., can alternatively be employed.

FIG. 5A shows a molding bowl 86 that serves as a mold designed for producing the ESA. In detail, the bowl 86 includes a central pillar 88. So configured, the bowl 86 defines an inner surface that is shaped as to define the particular physical dimensions and features of the ESA to be produced therein. For instance, the bowl 86 is configured to produce the ESA 50 shown in FIGS. 1–4B. As such, the bowl 86 includes an annular ridge 90 near the top edge of the bowl to form the ridge 67 of the first end 66 of the ESA 50 (FIG. 2), and a longitudinal tab 92 vertically defined on the central pillar 88 to form the notch 71 of the ESA (FIG. 3). Note that the bowl 86 can be formed of two or more pieces in order to facilitate removal of finished ESA therefrom.

The inner surfaces of the bowl 86 are such that they provide an appropriate molding surface. If desired, a top cover portion (not shown) can be included to further define the shape of the ESA. The inner surfaces should have a low-stick surface to assist in ESA removal from the mold when production thereof is complete. As such, the inner surfaces can be coated with TEFLON® coatings (a product produced by DUPONT® Company), or can be otherwise prepared, including anodizing the inner surface or coating it with a mold release agent, to have a low-stick or lubricated surface.

FIG. 5B shows a cross-sectional view of the bowl 86 of FIG. 5A having a stator, such as the stator 52, positioned therein. As shown, the central pillar 88 is sized to allow the central cavity 52A of the stator 52 to receive the pillar therein. It should appreciated that the diameter of the central pillar 88 can be modified to produce varying ESA configurations. In the present embodiment, for instance, the diameter of the central pillar 88, designated at D, corresponds to that of the stator central cavity 52A in order to produce an ESA having a corresponding inside diameter (see, e.g., the inside diameter 60 of the ESA 50 in FIGS. 3–4B). In other embodiments, the central pillar diameter D can be adjusted such that the ESA inside diameter is smaller or larger that the inside diameter of the stator 52.

A plurality of set screws 94 or other suitable structure can be included near the base of the central pillar 88 to maintain the desired height of the stator 52 within the bowl 86 in preparation for molding. The height of the stator 52 within the bowl 86 can be adjustable as needed for the particular application.

FIG. 5C shows the bowl 86 in cross section having both the stator 52 and the covering portion 54 of the ESA 50 positioned therein. As this figure shows, once the stator 52 is appropriately positioned within the bowl 86, the material comprising the covering portion 54 can be prepared and inserted into the bowl. In the present embodiment, silicone adhesive 3-6642 is used in forming the covering portion 54. In accordance with use of this product, silicone adhesive 3-6642 is formed from a two-part mixture of separate constituents. When mixed, the two parts form a flowable mixture that can be poured into the bowl to envelope the stator 52 within the bowl and conform to the features defined in the bowl. Note that the stator wires 62 and electrical connectors 64 (FIGS. 2, 3) are positioned such that they are not enveloped by the mixture, but rather are kept exposed for later use.

Once the mixture has been poured into the bowl 86, the mixture can be de-aired in a vacuum environment to remove air bubbles from the mixture. The mixture can then be cured by placing the bowl 86 and its contents into a heated environment for a predetermined time at a specified temperature. Once this process is complete, the ESA, now formed, can be removed from the bowl 86. Surface cleaning and removal of residual flashing can then be performed, as well as any further steps to prepare the ESA for use in an x-ray tube assembly. It is appreciated that in other embodiments, other or alternative steps can be performed to form the ESA. Note also that each production step described above is preferably performed before the ESA is positioned within the outer housing 11.

It should be noted that, as a result of the above process for producing an ESA, the windings 58 of the stator 52 are encapsulated by the covering portion 54. Thus, the windings 58 are fixed in position by the covering portion 54. Advantageously, this prevents noise from being produced by the windings 58 in the presence of rotation-induced resonances in the tube 10 during operation. As a result, tube operation is quieter, which reduces stress for a patient that in some medical procedures, for instance, must be positioned in close proximity to the tube. In addition, this encapsulation prevents dirt, dust, grime, etc. from entering the stator 52 and affecting its operation, thereby increasing the operational life of the stator.

Reference is now made to FIGS. 6A–6C in describing the assembly of the x-ray tube 10, including the insertion of an encapsulated stator assembly as disclosed herein. Once formation of the ESA 50 is complete, it can be assembled with other tube components. FIG. 6A shows insertion of the ESA 50, produced as described above, into the outer housing 11 of the x-ray tube 10. In this embodiment, the ESA 50 is inserted into an open end of the outer housing 11 with the first end 66 of the ESA entering first. In the present embodiment, some resistance to entry of the ESA 50 into the outer housing may be encountered, due to the fact that the outside diameter 70A of the ESA outer surface 70 is sized slightly larger than an inside diameter 11A (FIG. 1) of a corresponding portion of the outer housing 11. Lubricants, grease, etc. can be used here to facilitate entry of the ESA 50 here. FIG. 6C shows that a chamfer 96 can be included on the inner surface of the outer housing 11 to assist with insertion of the ESA 50. Once inserted into the outer housing 11, the ESA 50 is positioned within the housing at a predetermined location, wherein the stator 52 is appropriately located in relation to other tube components. The stator 52 can be electrically connected at this point to the x-ray tube 10 via the electrical connectors 64 (FIGS. 2–4A).

In FIG. 6B, after ESA placement, the evacuated enclosure 12 is shown being inserted into the outer housing 11. The evacuated enclosure 12 is inserted as shown in FIG. 6C such that a portion of the first segment 12A is received into the inner-cylindrical cavity 59 defined by the ESA 50. This positioning brings the rotor 24 (FIG. 1) into proximity with the stator 52 such that during tube operation the stator can impart a rotational force to the rotor in order to spin the rotary anode 14 (FIG. 1). FIG. 6C is a cutaway view of the outer housing 11, showing the approximate final positions of both the ESA 50 and the evacuated enclosure 12 within the outer housing. It is noted here that these steps are not meant to represent an exhaustive listing of the steps required to assemble an x-ray tube. Indeed, notwithstanding the above assembly steps, other steps can be performed before, after, or between the steps described herein.

Figure 7:
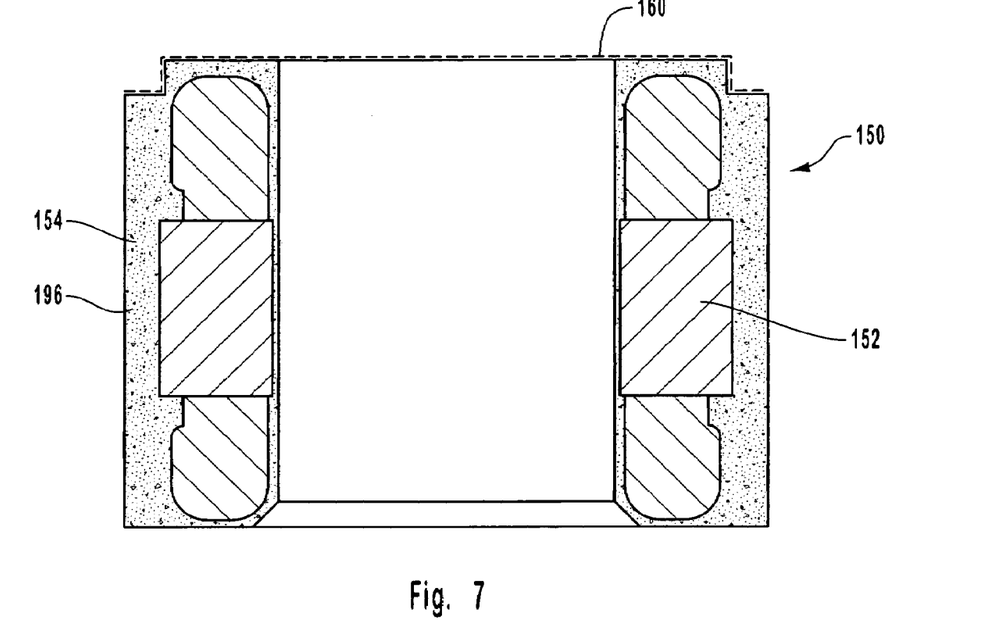
FIG. 7 is a cross-sectional view of an encapsulated stator assembly with x-ray shielding, according to another embodiment of the present invention.

Reference is now made to FIG. 7 in describing various details of the present invention according to another embodiment thereof. It is appreciated here that the covering portion can possess defined characteristics in accordance with a particular need for the stator-driven device, in this case, an x-ray tube. For example, it may be desirable to shield the stator region from x-rays, as part of a general tube shielding design, for instance. In accordance with this aim, an x-ray absorbing material can be incorporated into the covering portion of the ESA in order to enable the covering portion to absorb x-rays, thereby preventing their passage through the ESA. FIG. 7 shows one such ESA 150, having a stator 152 and covering portion 154. The covering portion 154 is composed of DOW CORNING® silicone adhesive 3-6642, as in the previous embodiment. In addition, an x-ray absorbing powder 196 has been added to the silicone adhesive 3-6642 during the manufacturing phase of the ESA 150, thereby causing the powder to be intermixed throughout the body of the final covering portion 154. The powder can include one or more of a variety of x-ray opaque materials, including molybdenum, tungsten, lead, and other appropriate high-Z materials. During operation of an x-ray tube having the ESA 150 located therein (such as the x-ray tube 10 shown in FIG. 1), x-rays produced at the target surface 32 of the anode 14 and incident on the ESA 150 are absorbed by the covering portion 154, thus preventing their escape from the tube. This additional shielding can serve to lower x-ray emission levels from x-ray tubes where the prevention of inadvertent x-ray escape is desired. Moreover, in another embodiment, such x-ray shielding can be formed to have varying shapes and configurations and be positioned in other areas about the x-ray tube 10, independently of the ESA, in order to provide additional x-ray shielding where needed.

In addition to x-ray absorbing powders, the ESA 150 can incorporate other x-ray absorbing structures in order to shield x-rays. One example is x-ray opaque plating that can be applied to inner or outer surfaces of the ESA, or incorporated within the body of the ESA itself. For example, FIG. 7 shows one possible location for placement of an x-ray opaque plating at an end surface of the ESA 150, indicated at 160. Other shielding structures and methods are also contemplated by the present invention.

Figure 8:
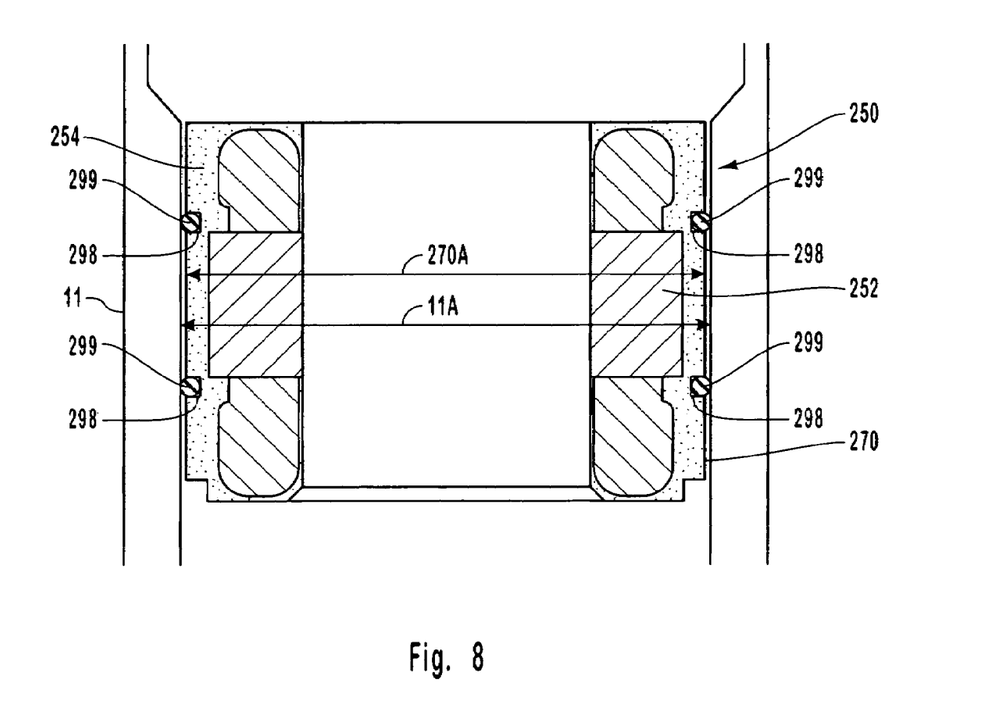
FIG. 8 is a cross-sectional view of an encapsulated stator assembly having an O-ring mounting system, according to another embodiment of the present invention.

Reference is now made to FIG. 8. As mentioned above, in some embodiments, it may not be desired or possible to utilize a resilient material to form the covering portion of the ESA. As such, other schemes for securing the ESA within the outer housing or other structure can be used. FIG. 8 shows one such scheme. An ESA 250 is shown in cross section, including a stator 252 and a covering portion 254. An outer surface 270 of the ESA 250 defines an outside diameter 270A that is less than the inside diameter 11A of the corresponding portion of the outer housing 11. The ESA 250 is supported and secured within the outer housing 11 via two (shown here) or more O-ring assemblies, each comprising an annular channel 298 defined about the ESA outer surface 270, and an O-ring 299 located in the channel. The respective components are sized such that each O-ring 299 compressively engages the inner surface of the outer housing 11, thereby securing the ESA 250 therein, and preventing ESA movement during tube operation. At the same time, the O-ring assemblies facilitate simple change-out of the ESA 250 when conditions dictate. In one embodiment, no channels are defined about the ESA; instead, one or more O-rings compressively engage between the ESA outer surface 270 and the inner surface of the outer housing to secure the ESA in place.

In addition to the above scheme, other means for supporting the ESA in a particular device are also contemplated and comprise part of the present invention. Further, in some embodiments, use of the ESA in a particular device may not require that the ESA be secured within a housing, or even secured at all.

In yet another embodiment, the ESA can be configured to attach directly to the x-ray tube, thereby obviating the need for a mounting interface with the outer housing. In still yet another embodiment, the ESA can be mounted directly to a portion of a device that in turn supports the x-ray tube. In these cases, it can be possible to completely eliminate the outer housing from the x-ray tube design, if desired.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. An encapsulated stator assembly for use in an x-ray tube, comprising:
   a stator having a core and a plurality of windings, the stator defining an inner periphery; and
   a covering portion that forms at least a partial covering over the stator, the covering portion including an outer surface that compressively engages with a portion of the x-ray tube to secure the stator in the x-ray tube, the covering portion further covering a portion of the inner periphery of the stator.

2. An encapsulated stator assembly as defined in claim 1, wherein the encapsulated Stator assembly is pre-formed before insertion into the stator-driven device.

3. An encapsulated stator assembly as defined in claim 1, wherein the covering portion forms a covering over the entirety of the stator.

4. An encapsulated stator assembly as defined in claim 1, wherein the covering portion is thermally conductive.

5. An encapsulated stator assembly as defined in claim 1, wherein the covering portion is made from a resilient material.

6. An encapsulated stator assembly as defined in claim 1, wherein the covering portion fixes the windings such that the windings are unable to vibrate during operation of the x-ray tube.

7. An encapsulated suitor assembly as defined in claim 1, wherein the covering portion further includes an x-ray absorptive material.

8. An x-ray tube, comprising:
   an outer housing containing an evacuated enclosure;
   an electron source and a rotary anode located within the evacuated enclosure;
   a rotor assembly that is rotatably attached to the rotary anode; and
   an encapsulated stator assembly, comprising:
      a stator that is positioned about the rotor assembly, the stator being substantially enveloped by a covering portion that is configured to secure the stator within the outer housing.

9. An x-ray tube as defined in claim 8, wherein the covering portion forms a resilient outer surface that compressively engages a surface of the outer housing.

10. An x-ray tube as defined in claim 8, wherein the covering portion dissipates heat produced by the stator during operation of the x-ray tube.

11. An x-ray tube as defined in claim 8, wherein the covering portion prevents contaminants from entering the stator.

12. An x-ray tube as defined in claim 8, wherein the covering portion is made from a silicone-based product.

13. An x-ray tube as defined in claim 8, wherein the encapsulated stator assembly includes a central cylindrical cavity that receives a portion of the evacuated enclosure.

14. An x-ray tube, comprising:
   an outer housing containing an evacuated enclosure;
   an electron source and a rotary anode located within the evacuated enclosure;
   a rotor assembly that is rotatably attached to the rotary anode; and
   an encapsulated stator assembly, comprising:
      a stator that is positioned about the rotor assembly, the stator being substantially enveloped by a covering portion that is configured to secure the stator within the outer housing, wherein the covering portion further comprises:
         an outer surface having at least two annular channels defined in the outer surface; and
         an O-ring positioned in each channel, each O-ring being compressively interposed between the respective channel and an inner surface of the outer housing.

15. An x-ray tube, comprising:
   an outer housing;
   an evacuated enclosure contained in the outer housing, the evacuated enclosure containing an electron source end a rotary anode having a target surface that is positioned to receive electrons produced by the electron source, the rotary anode being supported by a rotor assembly; and
   an encapsulated stator assembly, comprising:
      a stator having a core and a plurality of windings attached to the core; and
      a resilient covering portion that envelops the stator, wherein the resilient covering portion defines an outer surface that compressively engages an inner surface of the outer housing to secure the stator in a fixed position about the rotor assembly.

16. An x-ray tube as defined in claim 15, wherein the encapsulated stator assembly is pro-formed before being placed in the outer housing.

17. An x-ray tube as claimed in claim 16, wherein the compressive engagement between the outer surface of the encapsulated stator assembly and the outer housing provides sufficient contact pressure to facilitate heat transfer from the stator to the outer housing.

18. An x-ray tube as defined in claim 17, wherein the covering portion comprises a dielectric and thermally conductive material such that the covering material removes heat from the stator during operation of the x-ray tube.

19. An x-ray tube as defined in claim 18, wherein the covering portion comprises a silicone adhesive material.

20. An x-ray tube as defined in claim 19, wherein the encapsulated stator assembly further includes an x-ray shielding component.

21. An x-ray tube as defined in claim 20, wherein the x-ray shielding component comprises an x-ray absorbing powder that is integrated into the material that forms the covering portion.

22. An x-ray tube as defined in claim 20, wherein the x-ray shielding component comprises x-ray absorptive plating that is attached to a portion of the encapsulated stator assembly.

23. A stator assembly for use in an x-ray tube, comprising:
a stator having a core and a plurality of windings, the stator defining an outer periphery defined by an outer diameter and an annular inner periphery defined by an inner diameter; and
a compressible covering material that covers at least a portion of both the outer periphery and the inner periphery, wherein the compressible covering material that at least partially covers the outer periphery of the stator compressively engages a portion of the x-ray tube that houses the stator.

24. A stator assembly as defined in claim 23, wherein at least one of the inner periphery and the outer periphery of the stator is completely covered by the compressible covering material.

\* \* \* \* \*

UNITED STATES PATENT AND TRADEMARK OFFICE
CERTIFICATE OF CORRECTION

| | | |
|---|---|---|
| PATENT NO. | : 7,203,281 B2 | Page 1 of 1 |
| APPLICATION NO. | : 10/798637 | |
| DATED | : April 10, 2007 | |
| INVENTOR(S) | : Smith et al. | |

It is certified that error appears in the above-identified patent and that said Letters Patent is hereby corrected as shown below:

<u>Column 13</u>
Line 57, change "Stator" to --stator--

Signed and Sealed this

Sixteenth Day of November, 2010

David J. Kappos
*Director of the United States Patent and Trademark Office*